Figure 1:
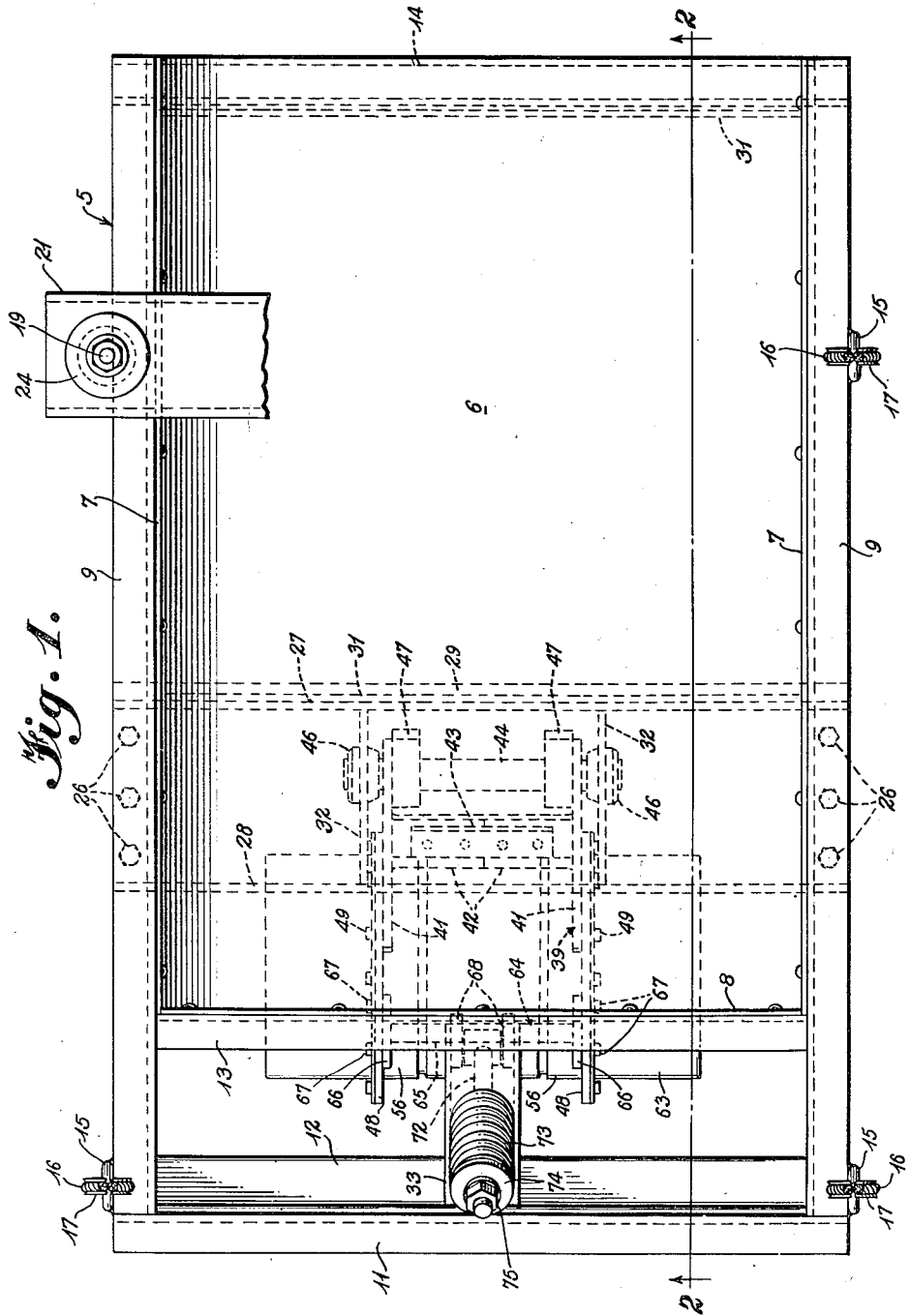

Nov. 20, 1956  A. MUSSCHOOT  2,771,179
OSCILLATING FEEDERS

Filed Sept. 27, 1955  3 Sheets—Sheet 1

United States Patent Office 2,771,179
Patented Nov. 20, 1956

2,771,179

OSCILLATING FEEDERS

Albert Musschoot, Park Ridge, Ill., assignor to Link-Belt Company, a corporation of Illinois Application September 27, 1955, Serial No. 536,830

10 Claims. (Cl. 198—220)

This invention relates to new and useful improvements in feeders and deals more particularly with vibrating feeders of the impetus force type.

Vibrating pans or troughs, supported for substantially linear movement with both vertical and horizontal components, have been used in the past for feeding bulk materials discharged from hoppers and other containers. In order to obtain this substantially straight line motion of the pans or troughs, mechanically driven units have conventionally employed a separately mounted, motor driven shaft having an eccentric portion connected to the pan or trough by a connecting rod. With this type of drive unit, problems frequently arise in connection with the provision of a suitably located base upon which the shaft and motor may be mounted. Further, since the shaft rotates relative to the base and the connecting rod, several bearings are required for the shaft with the attendant problems in connection with cost and lubrication.

Another conventional type of mechanical drive for resiliently supported vibrating feeders employs two parallel, unbalanced shafts which are separately mounted on the pan and are geared to each other for simultaneous rotation in opposite directions when one of the shafts is driven by an independently mounted motor. It will be readily apparent that this type of drive requires, in addition to the two shafts and weights, four bearings and two gears, the latter being oil lubricated and provided with an oil tight housing and seals which are expensive and difficult to maintain. A further problem is encountered with this type of drive in that the natural frequency of the spring-mass system of the pan and its resilient supports must be designed to a value below the imposed operating frequency so that the high amplitude vibrations of resonant operation are eliminated. On the other hand, the operating frequency must pass through the natural frequency range of the spring mass-system during starting and stopping of the unit so that short periods of resonant frequency operation with abnormally high amplitude vibrations do exist and may seriously damage the unit.

It is the primary object of this invention to provide a vibrating feeder which is actuated for substantially straight line movement by a mechanical drive supported entirely on the pan of the feeder and employing a minimum number of relatively rotatable connected parts.

A further important object of the invention is to provide a mechanically driven vibrating feeder having an enclosed drive mechanism supported entirely on the pan of the feeder, the entire feeder unit requiring only a single pair of bearing units for connecting the relatively movable parts.

Another object of the invention is to provide a vibrating feeder having a material supporting pan resiliently mounted for actuation by a straight line, impetus force type drive mechanism supported entirely on the pan, the drive mechanism being totally enclosed and employing a minimum number of relatively movable parts to reduce the initial cost and maintenance requirements of the feeder.

A still further object of the invention is to provide a resiliently supported vibrating feeder having a drive mechanism supported entirely thereon with a resilient connection between the drive mechanism and the pan of the feeder, the resilient support and the resilient connection being so designed as to eliminate high amplitude vibrations when the drive mechanism is accelerated through the natural frequency range of either the resilient support or the resilient connection.

Other objects and advantages of the invention will be apparent during the course of the following description.

Figure 2:
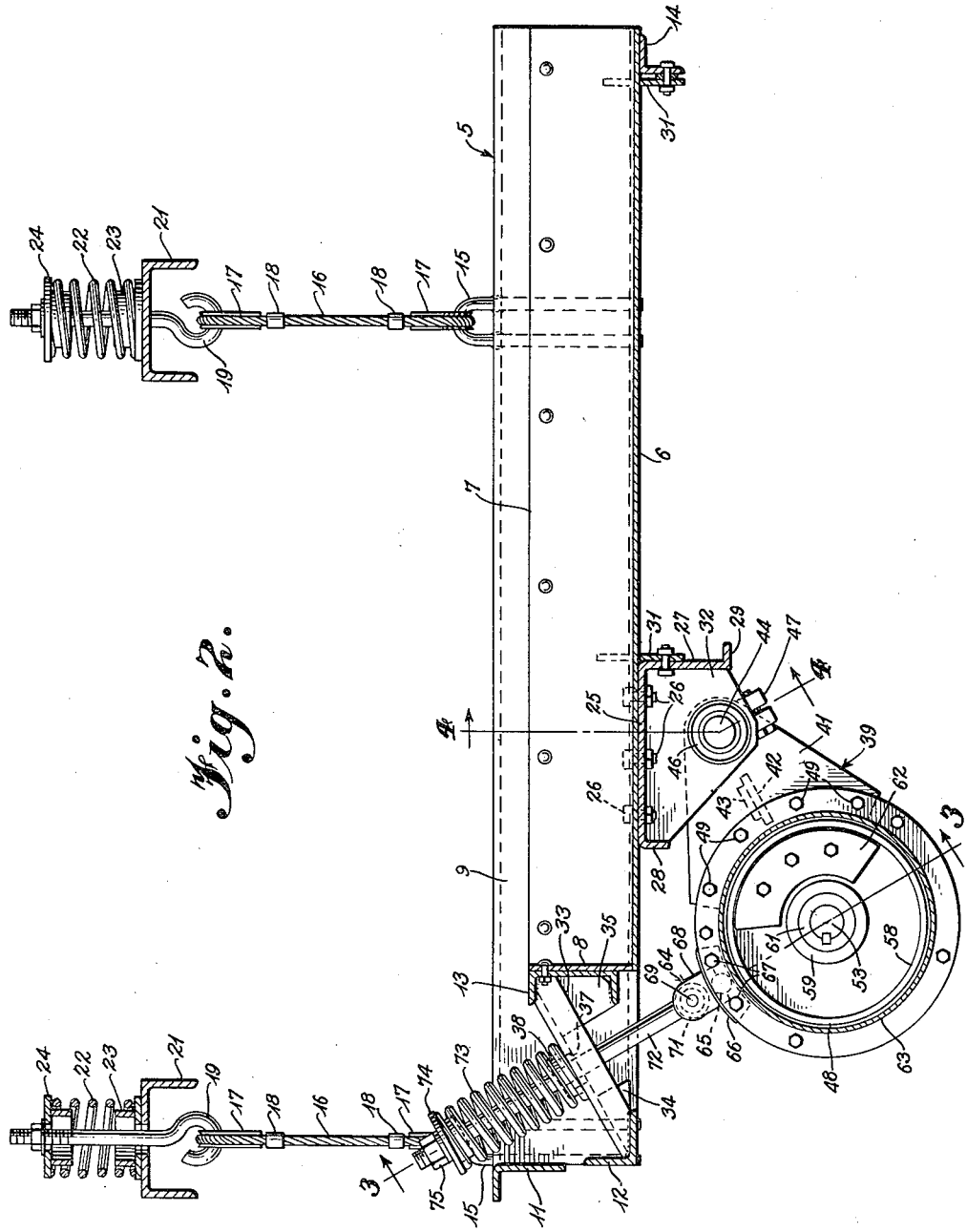
Figure 3:
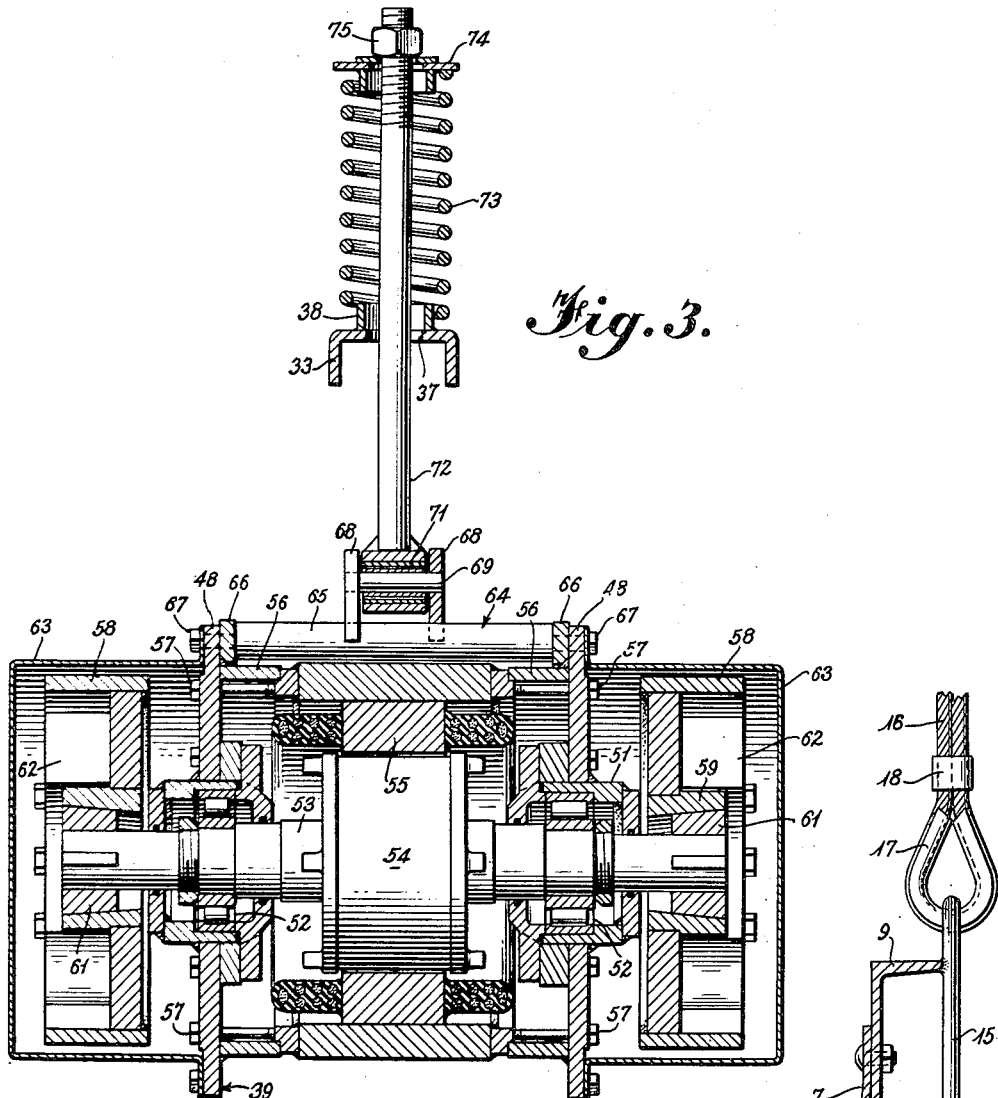
Figure 4:
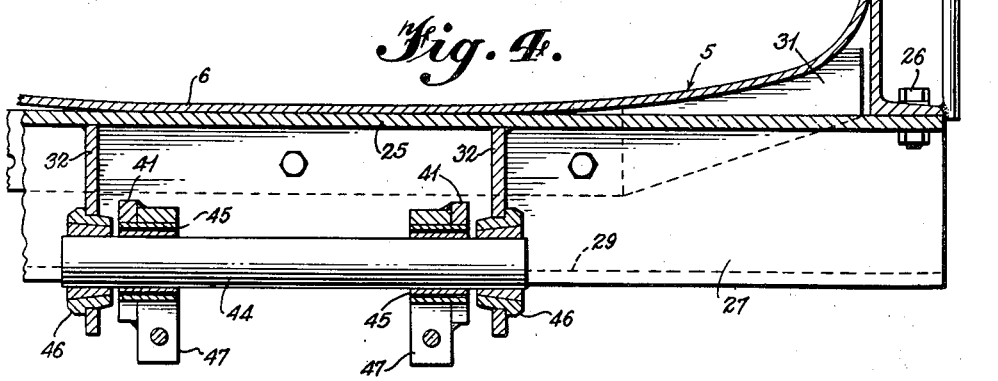

In the accompanying drawings forming a part of this specification and in which like reference characters are employed to designate like parts throughout the same, Figure 1 is a top plan view of a feeder embodying the invention, Figure 2 is a vertical sectional view taken on line 2—2 of Fig. 1, Figure 3 is an enlarged sectional view taken on line 3—3 of Fig. 2 and Figure 4 is a fragmentary sectional view taken on line 4—4 of Fig. 2.

In the drawings, wherein for the purpose of illustration is shown the preferred embodiment of the invention, and first particularly referring to Figs. 1 and 2, reference character 5 designates a vibrating pan over which material is to be moved. The pan 5 is formed with a material supporting trough or deck 6 having upwardly extending side walls 7 and an end wall 8 which extends across one end of the trough. Secured to each of the side walls 7 is a channel 9 which extends longitudinally beyond the end wall 8. The extended portions of the two channels 9 are connected to each other by laterally extending angle members 11 and 12 at the ends of the channels and by a laterally extending channel member 13 which is positioned adjacent the end wall 8 and is secured thereto. At the opposite end of the pan 5, an angle member 14 extends transversely between and is connected to the bottoms of the channels 9.

Mounted at corresponding points on the side of each channel 9 are two longitudinally spaced mounting brackets 15 which are each formed in the shape of an inverted U and extend upwardly from the channel members. Extending through the eye at the upper end portion of each bracket 15 is the lower end loop of a cable 16 which passes around a thimble 17 and is secured thereon by a clamp 18. The upper end portion of each cable 16 is provided with a similarly looped end portion having a thimble 17 and clamp 18 for receiving the end portion of a hook bolt 19. Each hook bolt 19 extends vertically through an opening in and is resiliently supported on any suitable structural member 21 by a spring 22 which is pressed between the annular spring seat 23 on the top surface of the structural member 21 and an annular spring seat 24 at the upper end of the hook bolt 19.

It will be readily apparent that the manner in which the pan 5 is suspended by the cables 16 and springs 22 will permit the pan to vibrate freely when actuated by a suitable drive mechanism.

Extending transversely between the bottoms of the channels 9 is an inverted channel bracket 25 which is rigidly connected thereto by the bolts 26. The bracket 25 is positioned at a point between the middle of the trough and the location of the end wall 8 for a purpose that will be later described. The flange 27 of the bracket 25 is deeper than the flange 28 and is provided with a stiffening flange 29 at its bottom edge portion. Bolted to the flange 27 and to the angle 14 at the open end of the trough 6 are two supporting plates 31 the upper edges of which are shaped to conform with and engage the bottom of the trough to support the latter. Mounted on the bottom of the bracket 25 between its flanges 27 and 28 are two laterally spaced, vertically arranged plates 32.

Suitably connected to and extending angularly upwardly between the angle member 12 and the channel member 13 at the end wall 8 of the trough 6 is an inverted channel member 33, see Figs. 1 and 2, the opposite end portions of which are structurally reinforced by plates 34 and 35 which are positioned between and rigidly connected to the web of the channel member and the angle 12 and channel member 13, respectively. An opening 37 is formed in the middle portion of the web of the channel member 33 and an annular spring guide 38 is suitably connected to the top surface of the channel member in surrounding relationship with the opening as is best illustrated in Fig. 3.

Referring now to Figs. 1 to 4, inclusive, for a detail description of the drive mechanism for vibrating the pan 5 and the manner in which the drive mechanism is supported on the pan, reference character 39 designates in its entirety a drive arm which is formed of two laterally spaced side bars 41 which are held in fixed spaced relationship by inwardly projecting spacer plates 42. The end edges of the spacer plates 42 meet in abutting relationship and the plates are connected by a single butt strap 43. One end of the drive arm 39 is pivotally connected to the pan 5 by a shaft 44 which extends transversely betweeen the plates 32 and through flexible bushings 45 in the corresponding ends of the side bars 41, as best illustrated in Fig. 4. The opposite ends of the shaft 44 are rigidly connected to the plates 32 by tapered bushings 46 which are arranged in axially aligned openings in the plates. The bushings 45 are fitted onto the shaft 44 and are clamped in aligned openings in the side plates 41 by split clamping collars 47 which are welded to the side plates with the splits thereof aligned with corresponding splits in the side plates. The bushings 45 are formed of any suitable flexible material which will permit limited pivotal movement of the drive arm 39 about the axis of the shaft 44.

At the opposite end of the drive arm 39, the side bars 41 are each provided with an annular bearing plate 48 which is rigidly bolted to its associated side bar by bolts 49. As illustrated in Fig. 3, cartridge type housings 51 are mounted in aligned openings in the two plates 48 for receiving antifriction bearing units 52 which support the shaft 53 for rotation on the drive arm 39. Mounted on the middle portion of the shaft 53 between the bearing cartridges 51 is the rotor 54 of a conventional electric motor. The stator 55 of the motor is clamped between inwardly extending annular flanges 56 on the plates 48 by bolts 57 to enclose the portion of the shaft 53 between the plates 48. Electric power for energizing the stator 55 is supplied by any conventional type of flexible conduit, not shown.

Mounted on each outwardly projecting end portion of the shaft 53 at each side of the drive arm 39 is a flywheel 58 having its hub 59 keyed onto the shaft by a tapered bushing 61. Mounted in like positions on the two flywheels 58 are counterweights 62 and housing members 63 are mounted on the outer sides of the two plates 48 to totally enclose the counterweighted flywheels.

The longitudinal axis of the drive arm 39 passes radially through the shafts 44 and 53. A supporting bracket 64 is positioned between and connected to the peripheries of the plates 48 at a point that is spaced approximately 90° from the longitudinal axis of the drive arm 39. The supporting bracket 64 is formed of a bar 65 having mounting pads 66 at its opposite end portions for receiving the cap screws 67 by means of which the bar is mounted between the plates 48. Mounted in spaced relationship on the bar 65 are two apertured lugs 68 for receiving the pin 69 which passes through the flexible bushing 71 in the eye of the flat sided eye bolt 72. This bolt is arranged to extend in a substantially radial direction relative to the shaft 53 and in normal relationship with the longitudinal axis of the drive arm 39 and passes through the opening 37 in the channel member 33.

A spring 73 is threaded on the upper end of the bolt 72 with its lower end resting on the upper surface of the channel member 33 around the spring guide 38. Positioned on the upper end portion of the bolt 72 against the upper end of the spring 73 is a spring seat 74 which is retained on the bolt by a nut 75. It will be readily apparent that the spring 73 is compressed between spring seat 74 and the top surface of the channel member 33 to resiliently support the free end portion of the drive arm 39 through the link provided by the bolt 72. Further, adjustment of the nut 75 will effect pivotal movement of the drive arm 39 about the axis of the shaft 44 so that the longitudinal axis of the drive arm 39 may be angularly adjusted relative to the plane of the trough 6. Since the bracket 25, carrying the shaft 44, is located between the middle and the closed end of the trough, the longitudinal axis of the drive arm 39 may be adjusted to a direction extending substantially through the center of gravity of the pan 5 and the material thereon when a normal quantity of a given material is supported on the trough 6.

Before discussing the manner in which the feeder operates, it will be noted that the total spring constant of the springs 22 is selected in accordance with the total mass to be supported thereby so as to provide a spring-mass system having a natural frequency below the imposed or operating frequency at which the shaft 53 is rotated. Movements of the pan 5 are thereby substantially isolated from the supporting members 21. The spring constant of the spring 73 is also selected so as to provide, in combination with the mass of the drive arm 39 supported thereby, a spring-mass system having a natural frequency below the operating frequency of the rotating shaft 53 and substantially equal to the natural frequency of the spring-mass system of the springs 22 and the mass which they support. Due to the fact that the spring-mass system provided by the spring 73 and the mass supported thereby is below the operating frequency of the feeder, deflections of this spring will impose only very small forces on the pan 5 during operation of the feeder. Further, the natural frequencies of the two spring-mass systems being equal, each system will act 180° out of phase with the other to greatly reduce or eliminate abnormal deflections of the springs 73 and 22 when the speed of rotation of the shaft 53 passes through the natural frequency range of the spring-mass systems during starting and stopping of the feeder.

The operation of the feeder will be described in detail as follows:

When the coils of the stator 55 are electrically energized, rotation will be imparted to the rotor 54 and the shaft 53 with its attached flywheels 58. The unbalanced condition of the flywheels 58 due to the counterweights 62 will cause rotation of the flywheels to develop a radially directed centrifugal force which rotates with and about the axis of the shaft 53. Components of this rotating force along the longitudinal axis of the drive arm 39 will act on the total combined mass of the pan 5, its contents, and the drive arm 39 with its associated structure. Components of the rotating force normal to the longitudinal axis of the drive arm 39, however, will act only on the portion of the mass of the drive arm 39 and associated structure which is supported by the spring 73. Those components of the force acting along the longitudinal axis of the drive arm 39 will effect substantially linear, reciprocating movement of the pan in the direction of its longitudinal axis and at an angle with the plane of the bottom of the trough 6 so as to impart a conveying action to the material in the trough. The components of the force acting in a direction normal to the longitudinal axis of the drive arm 39 will cause the drive arm to partake of pivotal movement about the axis of the shaft 44 and will vary the extent to which the springs 73 are compressed. In other words, the rotating shaft 53 will move through an elliptical path, with its displacement in the direction of the major axis of the ellipse being effective to vary the compression in the spring 73 and its displacement in the direction of the minor axis of the ellipse effecting substantially linear movement or translation of the deck 5.

Since the linear movement imparted to the deck 5 by the drive arm 39 lies at an acute angle with the effective plane of the bottom of the trough 6, any material delivered to the feed end of the trough 6 will be moved longitudinally of the trough for discharge from the open end portion thereof at a substantially constant rate.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. A vibratory feeder, comprising a material supporting pan, resilient means supporting said pan for vibratory movement, a drive arm connected to said pan for pivotal movement relative thereto, an unbalanced shaft mounted on said arm for rotation about an axis in spaced parallel relationship with the axis of said pivotal connection, said arm being connected to said pan with the axes of said shaft and said pivotal connection lying in a plane which is inclined relative to the plane of the pan bottom and passes substantially through the center of gravity of the pan and the material thereon, and drive means mounted on said arm for rotating said unbalanced shaft.

2. A vibratory feeder, comprising a material supporting pan, resilient means supporting said pan for vibratory movement, a drive arm pivotally connected to said pan, an unbalanced shaft mounted on said arm for rotation about an axis in spaced parallel relationship with the axis of said pivotal connection, resilient means supporting said arm relative to said pan in a position at which the axes of said shaft and said pivotal connection lie in a plane which is inclined relative to the pan and passes substantially through the center of gravity of the pan and the material thereon, and drive means mounted on said arm for rotating said unbalanced shaft to cause the latter to effect pivotal movement of said arm relative to the pan and substantially linear movement of the pan along said inclined plane.

3. A vibratory feeder, comprising a material supporting pan, spring means supporting said pan for vibratory movement, a drive arm having one end portion pivotally connected to said pan, an unbalanced shaft mounted on a portion of said arm spaced from said pivotal connection for rotation about an axis in parallel relationship with the axis of said pivotal connection, spring means associated with said pan and said drive arm to support the latter for pivotal movement in an inclined position relative to said pan and with the longitudinal axis of the arm passing substantially through the center of gravity of the pan and the material thereon, and a prime mover carried by said arm for driving said shaft to cause the unbalanced condition of the shaft to effect relative pivotal movement between said arm and pan and substantially linear reciprocating movements of the pan in the direction of the longitudinal axis of the drive arm.

4. A vibratory feeder as defined in claim 3 further characterized by the spring means mounting said pan having a total spring constant to provide a natural frequency for the spring-mass system, that is formed by the spring means supporting the pan and the total mass supported by this spring means, which is substantially equal to the natural frequency of the spring-mass system that is formed by the spring means supporting the arm on the pan and the mass of the arm supported by this spring means.

5. A vibratory feeder as defined in claim 4 further characterized by the prime mover being normally operated at a speed to cause the frequency of the reciprocating movements of the pan to exceed the natural frequencies of the two spring-mass systems.

6. A vibratory feeder, comprising a material supporting pan, resilient means supporting said pan for vibratory movement, a drive arm connected to said pan for limited pivotal movement relative thereto, a shaft mounted on said arm for rotation about an axis in spaced parallel relationship with the axis of the said pivotal connection, counterweight means mounted on said shaft for rotation therewith to develop a rotating, radially directed force, said arm being connected to said pan with the axes of said shaft and said pivotal connection lying in a plane which is inclined relative to the pan bottom and passes substantially through the center of gravity of the pan and the material thereon, and drive means mounted on said arm for rotating said shaft to cause the counterweight means to develop said rotating force, the components of said force along said inclined plane effecting substantially linear reciprocating movements of said pan and the components of said force normal to said inclined plane effecting relative pivotal movement between said arm and pan.

7. A vibratory feeder as defined in claim 6 further characterized by said arm having laterally spaced side bars pivotally connected to the pan at one end portion of the arm, axially aligned bearing means carried by said side bars for mounting said shaft, housing means mounted on said side bars and completely enclosing said shaft, counterweight means and drive means, and a link pivotally connected to the side bars and resiliently supported on said pan to support said arm with the axes of the shaft and the pivotal connection lying in said inclined plane.

8. A vibratory feeder as defined in claim 7 further characterized by said drive means having a rotor mounted on said shaft between said side bars and a stator positioned between and mounted on said side bars, and said counterweight means comprising two eccentrically weighted flywheels mounted on opposite end portions of said shaft outwardly of said side bars.

9. A vibratory feeder as defined in claim 7 further characterized by the pivotal connections between said arm and pan and between said link and side bars each including a flexible bushing positioned between the pivotally connected parts to eliminate rubbing engagement therebetween, and said bearing means comprising two spaced antifriction bearing units providing the entire support for said shaft.

10. A vibratory feeder as defined in claim 7 further characterized by the resilient means supporting said pan and the total mass supported thereby providing a spring-mass system having a natural frequency equal to that of the spring-mass system provided by the resilient support for said link and the mass supported thereby, and said drive means normally being operated at a frequency above said natural frequencies.

No references cited.